Patented Aug. 6, 1935

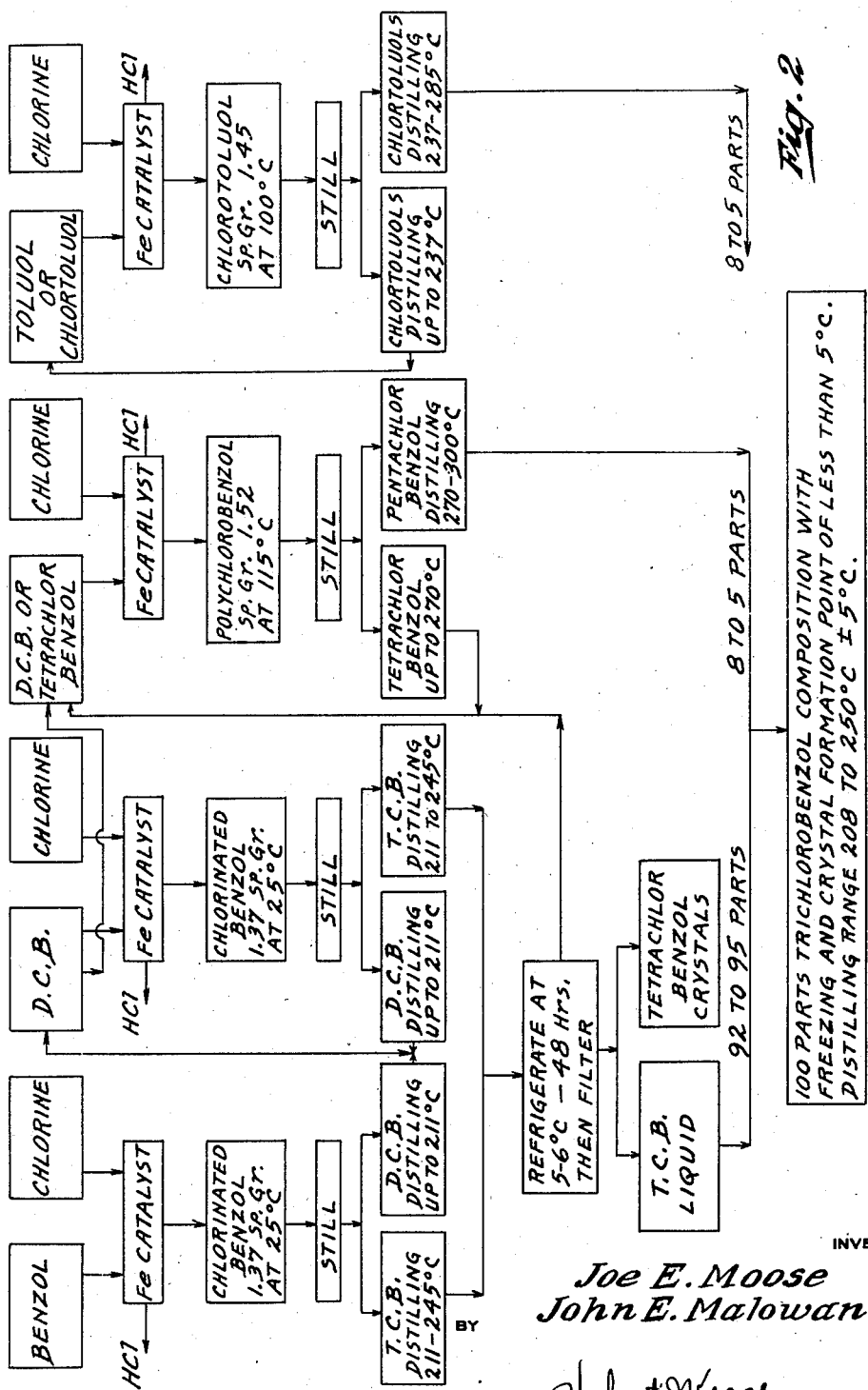

2,010,495

UNITED STATES PATENT OFFICE 2,010,495

DIELECTRIC COMPOSITION

Joe E. Moose and John E. Malowan, Anniston, Ala., assignors to Swann Research Incorporated, a corporation of Alabama Application August 24, 1932, Serial No. 630,200

15 Claims. (Cl. 252—1)

This invention relates to compositions of matter and more particularly to chlorinated aromatic hydrocarbons in which the chlorine has been substituted in the aromatic ring.

An important object of this invention is the provision of a low-freezing liquid composition of high stability comprising principally a high chlorinated benzol. A further object of this invention is the provision of a liquid composition comprising trichlorbenzol in combination with varying percentages of chlorinated aromatic one-ring hydrocarbon such as tetrachlorbenzol, pentachlorbenzol or tri- and tetrachlorotoluol. A further object is the provision of a process for manufacturing the composition.

Of the various isomers of chlorobenzol which have been proposed for electrical purposes involving insulation or heat transfer applications, or both combined, the trichlorobenzol isomers offer the greatest promise for successful applications in this field. For such purposes it is desirable to have a stable, non-flammable liquid of a fairly high boiling point combined with a low freezing point. While the isomers of trichlorobenzol have been known for a long time, no one, as far as we are advised, has succeeded in producing these isomers in the proper proportion by the direct chlorination of benzol.

The herein described process fulfills the requirement of an economical method for manufacturing a liquid composition comprising principally the desirable trichlorbenzol isomers in such proporton that the isomers remain liquid down to comparatively low temperatures, that is in the neighborhood of 6° to 9° C. It is further susceptible, by means herein described, of having the freezing point lowered to a still lower limit.

A composition such as that herein described is capable of many industrial applications, particularly in the electrical field where it may be employed as an insulating dielectric liquid either alone or in mixture with other substances. By virtue of its high boiling and low freezing point it may be used as an insulating oil in transformers. It is also useful as a heat transfer medium in many industrial applications. Other objects and advantages will appear as the description proceeds.

As will be apparent from the following description, when read in conjunction with the drawing illustrating a flow sheet of the process, our improved composition consists principally of a trichlorobenzol fraction to which varying amounts of chlorinated single-ring aromatic hydrocarbons, such as other chlorinated benzols or chlortoluols, have been added for the purpose of lowering the freezing point. The trichlorbenzol fraction is not, however, a mixture of the pure trichlorobenzol isomers, but rather a fraction obtained by the chlorination of benzol to a particular specific gravity followed by distillation of the chlorination product to a predetermined boiling point.

The following examples are presented for the purpose of rendering our invention more readily understandable by those skilled in the art.

*Example I.*—Chlorinate benzol by passing chlorine gas into liquid benzol in the presence of an iron catalyst at a temperature ranging from 25° to 50° C. until the product has attained a specific gravity of 1.37 at 25° C. After washing the product to remove hydrochloric acid and iron chlorides, it is distilled first with fractionation until substantially all of the dichlorobenzols have been removed, which occurs at temperatures up to 211° C. After this the residue is distilled without fractionation (i. e. without reflux) until a temperature of 245°±5° C. is reached. The distillate obtained between 211° and 245° is principally trichlorobenzol; however, by an inspection of the known constants for the pure trichlorbenzol isomers it will be seen that while these isomers boil between 208° and 219° C., our simple distillation is carried out over a considerably greater range than is necessary for the separation of the mixed pure isomers. We have found, however, after considerable experimentation that the temperature range above chosen will give a fraction having a low freezing point and furthermore a fraction which is susceptible, by means which will hereinafter more fully appear, of having the freezing point substantially lowered. The freezing point (or hold point) of the trichlorobenzol fraction will vary from 5.2° to 8.6° C., while the crystal formation point (temperature at which crystals begin to form) will vary from 4° to 11° C.

For some purposes it is desirable to have the crystal formation point below the hold point. If this is desired, we refrigerate the 211° to 245° C. fraction to a temperature of 5° to 6° C. for a period, usually in excess of 48 hours, and then filter off the crystals produced. The liquid remaining will have a hold point in the neighborhood of 5° C. and a crystal formation point below the hold point.

*Example II.*—The dichlorobenzols, obtained as a fraction boiling up to 211° C., are chlorinated in the manner described in Example I by passing chlorine gas into the liquid until the specific gravity of the liquid has become 1.37 at 25° C. The chlorinated product is then washed as in Example I and distilled, the same fractions being obtained as therein described. The trichlorobenzol fraction will have a slightly higher freezing point (6° to 8° C.) than that obtained in Example I; however, on combining the trichlorobenzol fraction with the corresponding fraction obtained in Example I, the mixture will have a somewhat lower freezing point (5° to 6° C.). The combined trichlorbenzol fractions may then be subjected to refrigeration at a temperature of 5° to 6° C. in order to lower the crystal formation point below the hold point, as described in Example I above.

*Example III.*—In order to lower the freezing or hold point still further, we may add to the trichlorobenzol fraction, a small amount (5% to 8%) of a pentachlorobenzol obtained as follows:—Chlorinate the dichlorobenzol fraction (boiling up to 211° C.) or the crystals obtained on refrigerating the trichlorobenzol fractions to 5° or 6° C., and which are mostly the 1,2,4,5-tetrachlorobenzol isomer, in the presence of an iron catalyst to a specific gravity of 1.52 at 115° C. This chlorination requires a somewhat higher temperature because of the higher freezing point of the chlorination product. Usually temperatures ranging from 70° to 160° C. will be found necessary. The chlorination product thus obtained is distilled and a pentachlorobenzol fraction boiling between 270° and 300° C. is obtained. The tetrachlorobenzol fraction boiling to 270° C. is returned for further chlorination.

The pentachlorobenzol fraction boiling between 270° and 300° C. is now added to the trichlorobenzol fraction obtained as described in Examples I and II in the proportions of 92 to 95 parts of the trichlorobenzol fraction to 8 to 5 parts of the pentachloro fraction, thereby giving 100 parts of an improved fluid dielectric composition in which the crystal formation and the freezing point are both below 5° C. Such a product will have a distilling range of from 208° to 250° C.±5° C.; a power factor of 0.95%; and a dielectric constant of from 3.98 to 4.0.

The flow sheet embodying Examples I to III is shown as Fig. 1 on the drawing.

*Example IV.*—Instead of employing the pentachlorbenzol fraction as described in Example III, we may chlorinate toluene to a chlorine content above the trichloro stage. We have discovered that by chlorinating toluene to a specific gravity of 1.45 at 100° C. and then distilling to obtain a fraction boiling between 237° and 285° C.; the fraction, consisting chiefly of mixed tri- and tetrachlorotoluols, has the same effect in decreasing the freezing and crystal formation points as does pentachlorobenzol. As a result of this discovery the same proportion (5 to 8 parts) of the chlorotoluol fraction is added to 95 to 92 parts of the trichlorobenzol fraction to give 100 parts of the desired product.

Fig. 2 of the accompanying drawing illustrates the flow sheet pertaining to Example IV.

The chlorotoluols produced on chlorination according to our preferred method are those in which the chlorine has been substituted in the ring rather than in the side chain. In order to effect substitution in the ring, rather than in the side chain, the chlorination reaction is carried out by passing chlorine gas into liquid toluene at a temperature beginning at 40° to 50° C. and gradually increasing this as the amount of chlorine combined is increased. The final temperature is usually in the neighborhood of 90° C.

Some variation may, of course, be made in the procedures described in the above examples. While iron is the preferred catalyst for chlorination, other known chlorination catalysts may be employed. Such catalysts may be either iodine, antimony chloride, molybdenum chloride, or any other suitable catalyst.

The single figure of the accompanying drawing shows in detail the relationship of the processes set out in the several examples and the characteristics of the products obtained thereby. In this flow sheet the abbreviation T. C. B. is used to indicate the trichlorobenzol fraction, while D. C. B. indicates the dichlorobenzol fraction.

Some further variation may be made in the extent of chlorination and in the temperatures of distillation of the products without greatly altering the results. For this reason the figures given in the examples and in the accompanying drawing are to be considered as those representing the best practice as known to us at this time, but should not be regarded as the only conditions defining a workable process. Accordingly, changes may be made in many of the operations herein described, which will be apparent to those skilled in the art.

From the flow sheet shown and the examples given, it will be apparent that by the process disclosed a product may be obtained comprising principally trichlorobenzol but having a freezing point considerably below that shown by the pure isomers, and furthermore such a product may be obtained by the direct chlorination of benzol without waste or production of useless by-products.

While we have described only a few embodiments of our invention, it will be apparent to those skilled in the art that it is not so limited, but that it is susceptible of various changes and modifications without departing from the spirit thereof, and we desire that only such limitations shall be placed thereupon as may be imposed by the prior art, or as are specifically set forth in the claims.

What we claim is:—

1. A composition of matter which comprises a major proportion of a mixture of the trichlor isomers of benzol as obtained by the chlorination of benzol and a minor proportion of pentachlorbenzol dissolved therein.

2. A composition of matter which comprises principally trichlorobenzol isomers obtained by the chlorination of benzene, and boiling over the range between 211° C. and about 245° C., and a smaller amount of pentachlorbenzol miscible therewith, said composition having a freezing point in the neighborhood of 5° C.

3. A composition of matter which comprises principally of a mixture of the isomers of trichlorobenzol obtained by the chlorination of benzol, said composition having a boiling range between 208° C. and 250° C. and a freezing point of less than 11° C.

4. A process for producing a composition comprising principally trichlorobenzol which consists in chlorinating benzol to a specific gravity of about 1.37 at 25° C., separating therefrom the lower chlorinated isomers of benzol and then distilling the trichlorobenzol isomers boiling between 211° C. and 245° C.

5. A process for producing a composition comprising principally trichlorobenzol which consists in chlorinating benzol to a specific gravity in the neighborhood of 1.37 at 25° C., separating therefrom the lower chlorinated isomers of benzol, distilling the trichlorobenzol isomers boiling between 211° C. and 245° C., and refrigerating the trichloro isomers to remove therefrom insoluble tetrachloro isomers.

6. A process for producing a composition comprising principally trichlorobenzol which consists in chlorinating benzol to a specific gravity in the neighborhood of 1.37 at 25° C., separating therefrom the lower chlorinated isomers boiling below 211° C., distilling the trichloro isomers boiling between 211° C. and 245° C., chlorinating said lower chlorinated isomers to a gravity of 1.37 at 25° C., distilling said chlorinated isomers and combining the trichloro isomers thereby obtained with those previously obtained to produce said composition.

7. A process for producing a composition comprising principally trichlorobenzol according to claim 6, in which the trichloro isomers obtained on distillation are refrigerated at a temperature in the neighborhood of 5° C. to 6° C. in order to remove therefrom higher chlorobenzol isomers insoluble therein.

8. A process according to claim 6 for producing a composition comprising principally trichlorobenzol having a freezing point below 6° C. in which pentachlorobenzol is added to the trichloro isomers in order to lower the freezing point thereof.

9. A composition of matter which comprises principally mixed trichlorobenzol isomers obtained by the chlorination of benzene and boiling over the range between 211° C. and about 245° C., and a smaller amount of a material selected from the class consisting of pentachlorobenzol, a mixture of tri- and tetra-chlorotoluols.

10. A composition of matter which comprises principally mixed trichlorobenzol isomers obtained by the chlorination of benzol and boiling within the range between 211° C. and about 245° C., and a smaller amount of a material selected from the class consisting of a pentachlorbenzol fraction distilling between 270° C. and 300° C., a chlortoluol fraction distilling between 237° C. and 385° C.

11. A composition of matter which comprises principally trichlorbenzol isomers obtained by the chlorination of benzol and boiling within the range between 211° C. and about 245° C., with from 5% to 8% of a material selected from the class consisting of pentachlorbenzol, a mixture of tri- and tetra-chlortoluols.

12. A composition of matter which comprises a mixture of the isomers of trichlorbenzol having a distilling range between 211° and 245° C. and obtained by the chlorination of benzol and from which crystals separate only at a temperature below 11° C.

13. A composition of matter which comprises principally a mixture of isomers of trichlorbenzol distilling within the range 211° to 245° C., and obtained by the chlorination of benzol together with a smaller amount of pentachlorbenzol sufficient to lower the freezing point of the mixture to below 9° C.

14. A composition of matter which comprises principally a mixture of isomers of trichlorobenzol obtained by the chlorination of benzol and distilling over the range between 211° C. and about 245° C. and a higher chlorinated benzol fraction containing chiefly pentachlorbenzol, said highly chlorinated fraction boiling within the range 270° C. to 300° C. and being present in amount sufficient to lower the freezing point of the mixture to below 9° C.

15. A composition of matter which consists principally of a mixture of trichlorobenzol isomers obtained by the chlorination of benzol and boiling over the range between 211° C. and about 245° C., together with 5% to 8% of pentachlorobenzol, said composition having a dielectric constant in the neighborhood of 4.

JOE E. MOOSE.
JOHN E. MALOWAN.